United States Patent
Levesque

(10) Patent No.: US 11,726,557 B2
(45) Date of Patent: Aug. 15, 2023

(54) METHOD AND SYSTEM FOR THE DETECTION AND AUGMENTATION OF TACTILE INTERACTIONS IN AUGMENTED REALITY

(71) Applicant: InterDigital VC Holdings, Inc., Wilmington, DE (US)

(72) Inventor: Vincent Levesque, Verdun (CA)

(73) Assignee: InterDigital VC Holdings, Inc., Wilmington, DE (US)

(*) Notice: Subject to any disclaimer, the term of this patent is extended or adjusted under 35 U.S.C. 154(b) by 0 days.

(21) Appl. No.: 17/838,696

(22) Filed: Jun. 13, 2022

(65) Prior Publication Data

US 2022/0300087 A1    Sep. 22, 2022

Related U.S. Application Data

(63) Continuation of application No. 17/221,593, filed on Apr. 2, 2021, now Pat. No. 11,360,572, which is a
(Continued)

(51) Int. Cl.
G06F 3/01       (2006.01)
G06F 18/24     (2023.01)

(52) U.S. Cl.
CPC .............. *G06F 3/011* (2013.01); *G06F 3/016* (2013.01); *G06F 3/017* (2013.01); *G06F 18/24* (2023.01)

(58) Field of Classification Search
CPC . G06F 3/01; G06F 3/011; G06F 3/016; G06F 3/017; G06F 18/24; G06F 18/2411; G06K 9/6267
See application file for complete search history.

(56) References Cited

U.S. PATENT DOCUMENTS 8,493,354 B1    7/2013   Birnbaum
9,037,125 B1    5/2015   Kadous
(Continued)

FOREIGN PATENT DOCUMENTS

CN    103858073 A    6/2014
CN    103970265 A    8/2014
(Continued)

OTHER PUBLICATIONS

International Search Report and Written Opinion of the International Searching Authority for PCT/US2018/022976 dated Jun. 13, 2018 (11 pages).
(Continued)

*Primary Examiner* — Sardis F Azongha

(57) ABSTRACT

Program actions may be initiated after detection of a predefined gesture by a user with a real-world object. Users may interact with their physical environment in an augmented reality by detecting interactions with real objects using a combination of location and motion detection, material identification using wearable sensors, or both. Based on detected sensor data from user interaction with a real-world object, a predefined gesture may be identified and a program action associated with that target interaction for
(Continued)

the real-world object may be executed. In some cases, the user experience may be enhanced by providing haptic feedback in response to tactile gestures and resulting events.

20 Claims, 6 Drawing Sheets

Related U.S. Application Data continuation of application No. 16/493,678, filed as application No. PCT/US2018/022976 on Mar. 16, 2018, now Pat. No. 10,969,874.

(60) Provisional application No. 62/474,341, filed on Mar. 21, 2017.

(56) References Cited

U.S. PATENT DOCUMENTS

| | | | |
|---|---|---|---|
| 9,367,136 | B2 | 6/2016 | Latta |
| 9,508,008 | B2 | 11/2016 | Jerauld |
| 9,600,076 | B2 | 3/2017 | Levesque |
| 9,658,693 | B2 | 5/2017 | Levesque |
| 9,996,738 | B2 * | 6/2018 | Boshernitzan ..... G06K 9/00536 |
| 2008/0024459 | A1 | 1/2008 | Poupyrev |
| 2013/0002544 | A1 | 1/2013 | Norieda |
| 2014/0198130 | A1 | 7/2014 | Lacroix |
| 2014/0253302 | A1 | 9/2014 | Levesque |
| 2014/0368423 | A1 | 12/2014 | Brenckle |
| 2015/0049012 | A1 | 2/2015 | Liu |
| 2015/0062086 | A1 | 3/2015 | Nattukallingal |
| 2015/0288804 | A1 | 10/2015 | Kadous |
| 2015/0302652 | A1 | 10/2015 | Miller |
| 2016/0179198 | A1 | 6/2016 | Levesque |
| 2016/0179199 | A1 | 6/2016 | Levesque |
| 2017/0052599 | A1 | 2/2017 | Katz |
| 2017/0139480 | A1 | 5/2017 | Tuovinen |
| 2017/0242488 | A1 | 8/2017 | Levesque |
| 2018/0059797 | A1 | 3/2018 | Lopez Meyer |

FOREIGN PATENT DOCUMENTS

| | | | |
|---|---|---|---|
| CN | 104739519 A | 7/2015 | |
| CN | 105117016 A | 12/2015 | |
| WO | WO-2013165348 A1 * | 11/2013 | ............... G01H 1/00 |
| WO | 2015192117 | 12/2015 | |
| WO | 2016170717 A1 | 10/2016 | |

OTHER PUBLICATIONS

Written Opinion of the International Preliminary Report on Patentability for PCT/US2018/022976 dated Feb. 15, 2019 (6 pages).
International Preliminary Report on Patentability for PCT/US2018/022976 completed on Jun. 13, 2019 (6 pages).
Wikipedia, "CastAR". Retrieved from https://en.wikipedia.org/w/index.php?title=CastAR&oldid=755693831, Dec. 19, 2016, 3 pages.
Porject Soli, "Your Hands are the Only Interface You'll Need". Web Archive, retrieved from: https://web.archive.org/web/20170225005115/https://atap.google.com/soli/, Feb. 25, 2017, 7 pages.
Watanabe, H., et. al., "A Recognition Method for Continuous Gestures with an Accelerometer". Proceedings of the 2016 ACM International Joint Conference on Pervasive and Ubiquitous Computing: Adjunct (UbiComp '16), Sep. 12-16, 2016, pp. 813-822 (10 pages).
Gao, Y., et. al., "Deep Learning for Tactile Understanding from Visual and Haptic Data". IEEE International Conference on Robotics and Automation (ICRA), (2016), pp. 536-543 (8 pages).
Romano, J. M., et. al., "Methods for Robotic Tool-Mediated Haptic Surface Recognition". IEEE Haptics Symposium (HAPTICS), (2014), pp. 49-56 (8 pages).
Strese, M., et. al., "Multimodal Feature-based Surface Material Classification". IEEE Transactions on Haptics, (2016), pp. 1-14 (14 pages).
Foottit, J., et. al., "A Wearable Haptic Game Controller". International Journal of Game Theory & Technology, vol. 2, No. 1, (2016), pp. 1-19 (19 pages).
Kangas, J., et. al., "Using Gaze Gestures with Haptic Feedback on Glasses". Proceedings of the 8th Nordic Conference on Human-Computer Interaction: Fun, Fast, Foundational, (2014), pp. 1047-1050 (4 pages).
Salisbury, K., et. al., "Haptic Rendering: Introductory Concepts". IEEE Computer Graphics and Applications, vol. 24, No. 2, Mar.-Apr. 2004, pp. 24-32 (9 pages).
Wikipedia, "Microsoft HoloLens". Retrieved from https://en.wikipedia.org/w/index.php?title=Microsoft_HoloLens&oldid=769546175, Mar. 10, 2017 (9 pages).
Wikipedia, "Oculus Rift". Retrieved from https://en.wikipedia.org/w/index.php?title=Oculus_Rift&oldid=770839028#Controllers, Mar. 17, 2017 (17 pages).
Wikipedia, "Razer Hydra". Retrieved from https://en.wikipedia.org/w/index.php?title=Razer_Hydra&oldid=763453844, Feb. 3, 2017 (6 pages).
Wikipedia, "Pokemon Go". Retrieved from https://en.wikipedia.org/w/index.php?title=Pok%C3%A9mon_Go&oldid=771154219, Mar. 19, 2017 (35 pages).
Yeo, H.S., et. al., "RadarCat: Radar Categorization for Input & Interaction". Proceedings of the 29th Annual Symposium on User Interface Software and Technology (UIST '16), (2016), pp. 833-841 (9 pages).
Suzuki, R. et al., "Development of a 1-DOF wearable force feedback device with soft actuators and comparative evaluation of the actual objects and virtual objects in the AR space." In 2016 14th International Conference on Control, Automation, Robotics and Vision (ICARCV), pp. 1-6. IEEE, 2016 (6 pages).
He, Z. et al., "Virtual Reality (VR) and Augmented Reality (AR)" Designing Techniques of Posts and Telecommunications, Dec. 31, 2016 (2 pages).

* cited by examiner

METHOD AND SYSTEM FOR THE DETECTION AND AUGMENTATION OF TACTILE INTERACTIONS IN AUGMENTED REALITY

CROSS-REFERENCE TO RELATED APPLICATIONS

The present application is a continuation of U.S. patent application Ser. No. 17/221,593, filed Apr. 2, 2021, which is a continuation of U.S. patent application Ser. No. 16/493,678, filed Sep. 12, 2019, which is a national stage application under 35 U.S.C. 371 of International Application No. PCT/US2018/022976, filed on Mar. 16, 2018, which claims benefit under 35 U.S.C. § 119(e) from U.S. Provisional Patent Application Ser. No. 62/474,341, filed Mar. 21, 2017. All of the above-reference applications are incorporated herein by reference in their entirety.

BACKGROUND

Recently, AR games such as Niantic's Pokemon Go have enjoyed success. Interactions with AR applications currently take place through a touchscreen (e.g., flicking a ball to a virtual creature on a touchscreen) or through movements captured by GPS (e.g., walking one kilometer to release a virtual creature). Emerging interaction techniques also include free-air gestures (e.g., Microsoft Hololens) and wand-mediated interactions (e.g., Oculus Touch, Razer Hydra, Vive Controller).

Interactions with mobile AR applications are limited and do not allow rich, direct interactions with the user's environment. More specifically, these applications do not take advantage of the tactile interactions that are possible in a user's surroundings. Although engaging, these types of tactile interactions are not supported by current AR applications in part because no practical solution exists to detect them.

Systems relying on free-air gestures and wand-like controllers can be used to detect gestures but have not been used to detect rich tactile interactions with a real environment. They also require additional hardware beyond a smartphone and smart watch or activity tracker, and, in the case of the wand, require holding a device that limits manipulations of the environment.

Discussion of haptics and object interactions may be found in US Patent Publications 2016/0179198 and 2016/0179199. The use of sensors attached to a probe, including vibration sensors, to detect the properties of the surfaces being touched is discussed in Romano and Kuchenbecker, "*Methods for robotic tool-mediated haptic surface recognition,*" 2014 *IEEE Haptics Symposium, pp.* 49-56, and Strese, et al., "*Multimodal Feature-based Surface Material Classification*", *IEEE Transactions on Haptics*, pp. 1, 5555.

The systems and methods disclosed herein address the above issues, and others.

SUMMARY

In one embodiment, a method may comprise: operating a mobile device of a user to determine the user's location; based on the determined location of the user, retrieving information identifying (i) at least a first nearby real-world object, (ii) at least a first predefined gesture associated with the first real-world object, (ii) at least a first program action associated with the first predefined gesture, and (iv) at least a first haptic feedback response associated with the first program action; operating at least one sensor in communication with the mobile device to detect movement of the user; and responsive to a determination that the detected movement of the user matches the first predefined gesture: initiating the first program action; and controlling at least a first haptic feedback component in communication with the mobile device to execute the first haptic feedback response.

In one embodiment, a method may comprise: determining a user's location by at least one sensor of a mobile device of the user; retrieving, based on the determined location of the user, a list of nearby real-world objects each having at least one associated grouping of a target interaction, a program action, and a haptic response; detecting, with at least one sensor of the mobile device, a target interaction performed by the user; and responsive to matching the detected target interaction performed by the user to a first nearby real-world object of the retrieved list, initiating the program action and haptic response associated with the first nearby real-world object. In some cases, the target interaction may comprise a tactile interaction, a gesture action, or a combination thereof.

In one embodiment, a method comprises determining a location of a first user with at least one sensor of a mobile device; retrieving at least a first object entry from an object database based on the determined location of the first user, the first object entry comprising an identifier of a first proximate object, at least one gesture action associated with the first proximate object, and at least one program action associated with each of the gesture actions; detecting a first gesture performed by the first user with at least one sensor of the mobile device; matching the detected first gesture to at least one gesture action in the first object entry; and executing the at least one program action associated with the matched at least one gesture action.

In one embodiment, a method comprises initiating detection mode of a mobile device to await detecting of a tactile interaction of a first user with a first object; detecting movements and vibrations caused by the first user interacting with the first object in a natural environment, with at least one sensor of the mobile device; and responsive to a determination that detected movements and vibrations indicate a particular tactile interaction has occurred, initiating a first program action associated with said tactile interaction in a memory of the mobile device.

In some embodiments, a system may comprise a processor and a non-transitory storage medium storing instructions operative, when executed on the processor, to perform functions including those set forth above, and others.

BRIEF DESCRIPTION OF THE DRAWINGS

A more detailed understanding may be had from the following description, presented by way of example in conjunction with the accompanying drawings in which like reference numerals in the figures indicate like elements, and wherein.

DETAILED DESCRIPTION

Figure 1:
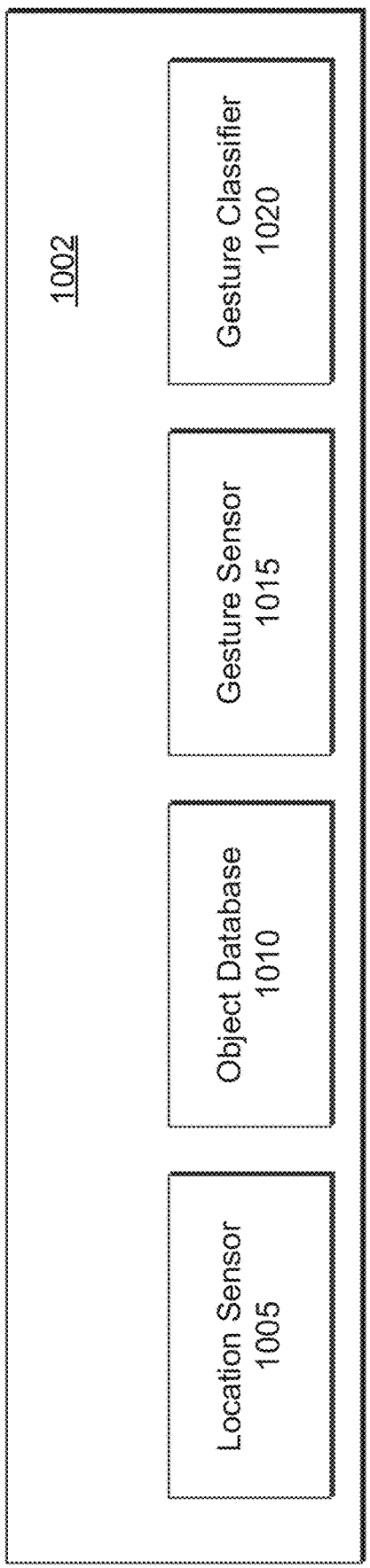
FIG. 1 illustrates components of a system for location-based detection of tactile interactions with the environment, according to an embodiment.

A detailed description of illustrative embodiments will now be provided with reference to the various Figures. Although this description provides detailed examples of possible implementations, it should be noted that the provided details are intended to be by way of example and in no way limit the scope of the application.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

In various embodiments, different approaches may be used to detect tactile interactions with the environment. In some cases, multiple approaches may be used together to improve the quality of the results.

Types of objects that may be interacted with include, but are not limited to, the following.

Outdoors interactions may include, for example and without limitation, interactions with nature, street furniture, the ground, buildings, visual content, parked cars, people, etc. Nature, for example, may include the trunk, branches or leaves of a tree or bush; a flower; a plant; a rock; sand; grass; water (e.g., a lake, a river, a puddle); snow; ice; etc. Street furniture, for example, may include a park bench, a lamp post, a stop sign, a traffic light, an orange cone, a mailbox, a fire hydrant, a memorial, a statue, a fountain, a guardrail, a garbage bin, a bus shelter, etc. The ground, for example, may include a gravel path, grass, a curb cut, textured pavement for the visually impaired, the edge of a sidewalk, etc. Buildings, for example, may include a wall, a door, a door handle, a window, a sign, a mat or carpet at the entrance of a building, etc. Visual content, for example, may include an advertisement (e.g., a poster, a video display), a sign, graffiti, etc. Parked cars, for example, may include a personal car, a shared car (e.g., car2go), a self-driving car (e.g., autonomous or automated vehicle, or semi-autonomous or semi-automated vehicle), a taxi or car providing a ride service (e.g., Lyft or Uber), etc. Interactions with a person may include, for example, shaking hands with someone, or tapping on someone's back, or the like.

Indoors interactions may include, for example and without limitation, architectural elements, furniture, the floor, electrical devices, moving parts, others, etc. Architectural elements may include, for example, a wall, a door, a door handle, a window, etc. Furniture may include, for example, a table, a counter, a chair, a sofa, an armrest, etc. The floor may include, for example, tiles, carpet, etc. Electrical devices may include, for example, a lamp, a television, speakers, a vending machine, etc. Moving parts may include, for example, a switch, a slider, a button, a latch, or the like. Others may include, for example, a pattern on a wall (or a painting, tapestry, etc.), clothes, etc.

Location-Based Approach. In one embodiment, location detection may be combined with gesture sensing in order to detect tactile interactions with a user's environment. First, location services (e.g., geolocation, GPS, indoor positioning such as with beacons, compass, etc.) may be used to determine the location (or position relative to a fixed point) of a user and query a database for nearby objects of interest. The user's location may include the user's orientation relative to their local environment (e.g., what is the user looking at). Gesture sensing (e.g., an accelerometer in a smartwatch or fitness tracker, a wearable motion sensor, external optical sensors) may then detect motion of the user's hand (or other body part). An algorithm may determine the likelihood that one or more recognized tactile gestures have been performed against an object of interest. For example, repetitive left-right motion on a vertical plane may trigger an action when performed in the proximity of a wall, as if resulting from brushing against the wall.

Sensor-Based Approach. In one embodiment, a sensor may be used to detect one or more material properties of an object being touched. For example, an accelerometer of a smartwatch or fitness tracker may be used to detect vibrations produced by an interaction with an object. An algorithm may determine the properties of a material being touched based on the detected vibration pattern. Motion estimation, such as from an accelerometer, may be used in some embodiments to improve the classification.

In some embodiments, these and other approaches may further be augmented by producing haptic feedback in response to tactile gestures and resulting events in an application. The haptic feedback may, for example, be used to confirm that a gesture is being recognized (e.g., a vibration of increasing intensity indicating progress towards a goal) or that an event has been triggered (e.g., a popping vibration). The haptic feedback could furthermore pertain to virtual objects, making the AR tactile. For example, the feel of a virtual creature could be simulated through vibrations in a watch when brushing against a wall.

The systems and methods disclosed herein may enable tactile interactions with a user's environment. Adding a tactile aspect to AR games may make the games more enjoyable and engaging, and provide more diverse gameplay. It may also provide an educational benefit by encouraging players to explore their environment with touch. The augmentation of these tactile interactions with haptic feedback may also improve their usability and the realism of the augmented reality.

The methods and systems described herein do not call for any instrumentation of the environment, or holding a controller. The methods and systems may operate in some embodiments with only a smartphone (or AR headset, etc.) and a wristband such as a smart watch or fitness tracker.

Systems and methods described herein may utilize sensor or haptic components of one or more devices or systems associated with the user. For instance, a user may have as one mobile device a smartphone (which may, for instance, have a sensor for determining the user's location), and also be wearing a smartwatch which may have a vibration sensor and a haptic feedback component. The various sensors, components, and devices may be in communication with each other, such that the smartphone may receive sensor data and control a haptic feedback component.

In one embodiment, a method may comprise: operating a mobile device of a user to determine the user's location; based on the determined location of the user, retrieving information identifying (i) at least a first nearby real-world object, (ii) at least a first predefined gesture associated with the first real-world object, (ii) at least a first program action associated with the first predefined gesture, and (iv) at least a first haptic feedback response associated with the first program action; operating at least one sensor in communication with the mobile device to detect movement of the user; responsive to a determination that the detected movement of the user matches the first predefined gesture: initiating the first program action; and controlling at least a first haptic feedback component in communication with the mobile device to execute the first haptic feedback response.

In some instances, the retrieved information may also comprise a location of the first real-world object, and determining whether the detected movement matches the first predefined gesture may include determining whether the user is touching the first real-world object associated with the first predefined gesture by: determining whether the user is within a threshold distance of the first real-world object based on the location of the first real-world object and the user's location; and determining, based on vibration detected by at least one sensor in communication with the mobile device, whether the user is touching an object.

In some instances, the retrieved information may further comprise a vibration profile of the first predefined gesture, and determining whether the detected movement matches the first predefined gesture may include determining whether the detected movement of the user matches the vibration profile of the first predefined gesture by: determining, based on vibration detected by at least one sensor in communication with the mobile device, that the user is touching an object; evaluating with at least one classification algorithm a likelihood of the at least first predefined gesture based on each of the detected movement and the detected vibration; calculating an average of the separate likelihoods; and selecting the first predefined gesture if the average of the likelihoods exceeds a threshold value. In some cases, the retrieved information may further comprise a location of the first real-world object, and determining whether the detected movement matches the first predefined gesture may further include: determining whether the user is within a threshold distance of the first real-world object based on the location of the first real-world object and the user's location.

In some instances, the retrieved information may further comprise a vibration profile of the first predefined gesture associated with the first real-world object, and determining whether the detected movement matches the first predefined gesture may comprise: determining, based on vibration detected by at least one sensor in communication with the mobile device, that the user is touching an object; evaluating with at least one classification algorithm a likelihood of the first predefined gesture based on the detected vibration; and matching the detected movement of the user to the vibration profile of the first predefined gesture if the likelihood of the first predefined gesture exceeds a threshold.

In some instances, the retrieved information may further comprise a location of the first real-world object and a vibration profile associated with the first predefined gesture and the first real-world object, and determining whether the detected movement matches the first predefined gesture may include determining whether the user is touching the first real-world object associated with the first predefined gesture by: determining whether the user is within a threshold distance of the first real-world object based on the location of the first real-world object and the user's location; determining, based on vibration detected by at least one sensor in communication with the mobile device, that the user is touching an object; and determining that the detected vibration matches the retrieved vibration profile.

In some instances, the retrieved information may further comprise a location of the first real-world object, and determining whether the detected movement matches the first predefined gesture may include: determining that the user is within a threshold distance of the first real-world object based on the location of the first real-world object and the user's location; evaluating with at least one classification algorithm a likelihood of the first predefined gesture based on the detected movement; and matching the detected movement to the first predefined gesture if the likelihood exceeds a threshold value.

In some instances, the retrieved information may further comprise a vibration profile of the first predefined gesture, said vibration profile associated with a first texture of a surface of the first real-world object, and determining whether the detected movement matches the first predefined gesture may comprise: determining, based on vibration detected by at least one sensor in communication with the mobile device, that the user is touching an object; evaluating with at least one classification algorithm a likelihood of the first predefined gesture based on the detected vibration; and matching the detected vibration to the retrieved vibration profile of the first predefined gesture.

In some instances, matching the detected movement of the user to the first predefined gesture may comprise: evaluating with at least one classification algorithm a likelihood of each of the at least first predefined gesture based on the detected movement of the user; and responsive to a determination that the first predefined gesture is evaluated as having a maximum likelihood, matching the detected movement of the user to the first predefined gesture.

In various embodiments, a threshold distance from the real-world object may be about an average person's arms length, about 1 ft, about 1 m, and/or the like. In various embodiments, threshold values for likelihood based on classification algorithms may be, for example, 95% or higher, 90% or higher, 85% or higher, 80% or higher, 75% or higher, and/or the like. In some cases, threshold values for likelihood based on classification algorithms may be a more likely than not point, such as about 51%, any value greater than 50%, etc.

In some instances, rather than a specific predetermined threshold distance factor, consideration of which real-world object a user is interacting with may utilize a likelihood factor based on a distance between the user and the real-world object. For example, such a likelihood may be higher within a certain range of the user (e.g., distances that are easily reachable by the user), and may decrease outside of this range as the distance increases. The likelihood output by a classifier may, for example, be weighted by such a distance-to-object likelihood factor to determine an improved likelihood of a given gesture. In some cases, a threshold may still be applied for the distance at which the distance-based likelihood factor is near zero, or below a certain minimum level.

In various instances, the first haptic feedback component in communication with the mobile device may comprise i) a haptic feedback module of the mobile device, or ii) a haptic feedback component of a haptic device of the user. In various instances, the retrieved information identifying the first haptic feedback response may indicate that the first haptic feedback response is a vibration, and executing the first haptic feedback response may comprise: controlling the first haptic feedback component to generate the vibration of first haptic feedback response.

In various instances, the retrieved information identifying the first haptic feedback response may indicate that the first haptic feedback response is a simulated texture, and executing the first haptic feedback response may comprise: detecting continuing movement of the user; and controlling the first haptic feedback component to generate the first haptic feedback response based on the detected continuing movement of the user. For example, after initial determination that the user is touching a brick wall with their hand, the haptic feedback component may generate the haptic response (such as a vibration) as the user continues to move their hand on the brick wall, and stop when the user removes their hand from the wall.

In various instances, the retrieved information identifying the first haptic feedback response may indicate that the first haptic feedback response is a simulated texture, and executing the first haptic feedback response may comprise: detecting vibrations resulting from continuing contact between the user and the first real-world object; controlling the first haptic feedback component to adjust the first haptic feedback response in view of the detected vibrations. As such, vibrations resulting from the user's interaction with a real world object may be factored into the execution of the haptic feedback response. For example, while the user's AR system overlays a first virtual texture (such as animal fur) on the real-world object (such as a brick wall), the haptic feedback component may monitor the vibrations resulting from the user touching the brick wall to adjust the haptic feedback response to improve the simulation of the user "touching" the virtual animal fur (e.g., increasing or decreasing the haptic feedback as appropriate).

In one exemplary scenario, the mobile device may comprise an augmented reality device, the first predefined gesture may be further associated with an augmented reality object presented to the user, the first program action may be an augmented reality user interaction with the augmented reality object, and the first haptic feedback response may simulate physical interaction of the user with the augmented reality object.

Location Based Embodiments

One embodiment of main components of a system for a location-based approach is illustrated in FIG. 1. In an embodiment, a system 1002 may comprise a location sensor 1005, an object database 1010, a gesture sensor 1015, and a gesture classifier 1020.

Location Sensor. The location sensor 1005 may detect the location of the user in space. The detected location of the user in space may be either relative or absolute. In one embodiment, it may comprise a GPS sensor. In other cases, other sensors may also be used, such as a digital compass or an indoor positioning system. Location sensor 1005 may be part of a smart watch, a smart phone, AR glasses, or any other device in the system.

Object Database. The object database 1010 may list the locations and properties of objects of interest within the user's environment. For each object of interest in the environment, for example, the database may list their location, type, allowed gestures, and resulting actions. In various embodiments, the object database 1010 may reside in the cloud, be local to the system, or comprise a combination of both (e.g., cached).

Gesture Sensor. The gesture sensor 1015 may detect gestures performed by the user. It may comprise an accelerometer embedded in a wearable device close to the hand, such as a smart watch or fitness tracker, or the like. Other options may include a depth camera (e.g., Kinect or leap motion), an electromyographic sensor (e.g., Myo armband), or any other system capable of detecting motion of the hands. These sensors may generally be in communication with the mobile device, and may be a component of the mobile device or another device associated with the user.

Gesture Classifier. The gesture classifier 1020 may comprise a software system that processes the information generated by the gesture sensor 1015 and determines which gesture has been performed. This may be done using machine learning techniques to learn from observations of different gesture and non-gesture sensor measurements. A gesture classifier may also be configured by specifying a set of fixed rules, such as conditions to be met for a certain gesture to be detected. This software may be executed on any computing device in the system, or in some embodiments in the cloud.

In some embodiments, rules for gesture detection may utilize a weighted sum of the likelihoods, which may give more weight to more reliable classifiers. The weights may be set dynamically, e.g., by having one or more classifiers report their confidence in current conditions. In other embodiments, a threshold for gesture detection by a classifier may be dynamic or otherwise variable. For example, the threshold may be set higher if a particular gesture may result in a serious (perhaps irreversible) action, such as releasing a "virtual creature" or executing a financial transaction.

Figure 2:
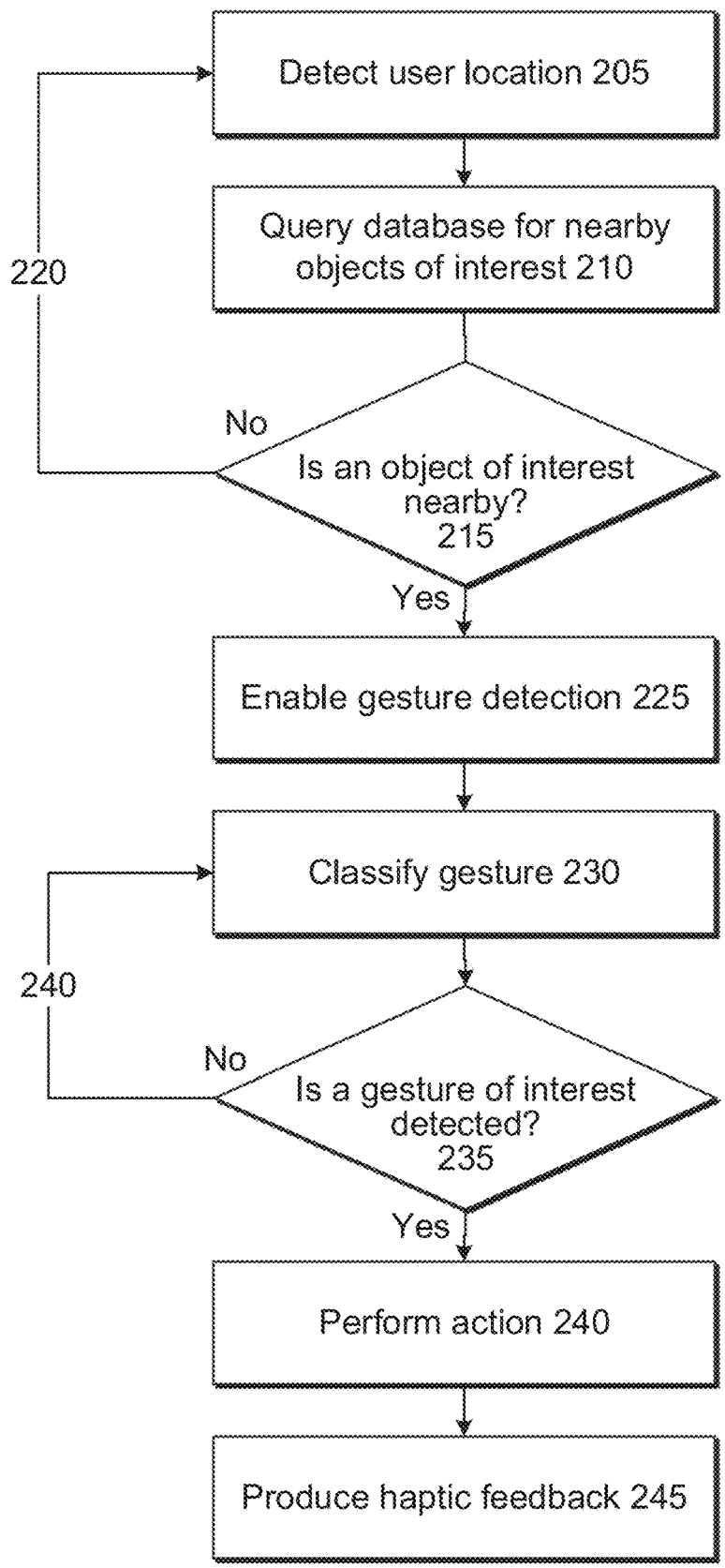
FIG. 2 illustrates a flow chart for location-based detection of tactile interactions with the environment, according to an embodiment.

A flow chart for one embodiment of a location-based approach is illustrated in FIG. 2. The user's location may be detected 205, using the location sensor (e.g., GPS) to detect the location of the user. The system may query the object database based on the user's location 210. The database may return the location and type of nearby objects, as well as the gestures and actions associated with them. Objects may include landmarks, walls, statues, benches, tables, lamp posts, windows, signs, or any other fixed object that can be touched. In some cases, objects may include objects which are not fixed, but whose location can be tracked. Gestures may include tapping, brushing, resting, pushing, scratching, poking, displacing a moving part, or any other gesture that can be performed against an object. The system may evaluate whether an object of interest is nearby 215. For example, the system may determine whether an object of interest is within reach of the user, in some embodiments taking into account the resolution of the location sensor. The system may also take into account the physical characteristics of the user, for example if they are known or can be estimated, in order to better estimate his or her reach. The reach of a user may, for example, be estimated based on their height and the length of their arms, which may in turn be estimated based on their age and gender. If no object of interest is nearby, the system may (220) continue updating the user location (205) and querying the database (210) until one is found.

Once an object of interest is determined to be nearby, the system may in some embodiments enable gesture detection 225. In such embodiments, the gesture detection system may be disabled until an object of interest has been detected nearby. In other embodiments, the system may keep gesture recognition enabled at all times. The system may then attempt to classify a detected gesture 230. For example, the system may run a classification algorithm to determine which of the gestures permitted against the object of interest has been performed. In one embodiment, the classification algorithm may be the result of a machine learning process: e.g., sensor data is recorded as a wide range of people perform different gestures; this data is used to train a machine learning algorithm to distinguish between the different gestures or no gesture at all; the algorithm is then capable of indicating the likelihood that a gesture has been performed based on sensor data. Some examples of such techniques are discussed in Watanabe, et al., "*A recognition method for continuous gestures with an accelerometer*", in *Proceedings of the* 2016 *ACM International Joint Conference on Pervasive and Ubiquitous Computing: Adjunct* (UbiComp '16), and Gao, et al., "*Deep learning for tactile understanding from visual and haptic data*", 2016 *IEEE International Conference on Robotics and Automation,* 2016, pp. 536-543. In some cases, it may be sufficient to distinguish between the hand being at rest (motion below a certain threshold of frequency and amplitude) and the hand being active.

The system may then evaluate whether a retrieved predefined gesture against the object of interest has been performed 235. For example, the system may determine if a gesture has been detected, and if this gesture is associated with the object of interest. If not, the system may continue looking for a gesture of interest (240) and updating the location of the user periodically.

Once a retrieved predefined gesture for the object of interest is detected as being performed by the user, the system may perform an action 240. In an embodiment, the database information specifies the action that results from the gesture. In the case of an AR game, for example, the action could be to transfer a digital asset (e.g., a monster, coins, points) to the account of the user and displaying feedback onscreen. If two objects of interest are detected in proximity, the gesture detector may disambiguate which is interacted with, and which action should be taken. It may for example assume that the object interacted with is the closest object or the object for which the gesture classifier indicates the greatest likelihood. The system may also ignore ambiguous gestures when more than one object is nearby, or whenever the distance to multiple objects or the likelihood of a gesture having been performed against them is too close to disambiguate them.

In some embodiments, the system may optionally produce haptic feedback in response to the gesture 245. This feedback may be produced on any haptic device in contact with the body of the user, including on a wearable band or on AR glasses. Any haptic technology may be used, including vibration, deformation, electrical stimulation, stroking, squeezing, variations in temperature, a change in the perceived coefficient of friction, and/or the like. The haptic feedback may indicate that a gesture is being detected (e.g., a continuous vibration), or that a gesture has been detected and has trigged an action (e.g., a brief, sharp vibration). The haptic feedback may also be tied to virtual content that is part of the AR simulation. A vibration, for example, may attempt to simulate the feel of a virtual animal's fur while touching a real wall. The system may also take into account the natural haptics produced by the real object as it renders the feel of the virtual object. The vibrations produced by a real wall, for example, may possibly be subtracted from the intended vibrations simulating a virtual animal's fur in order to improve the realism of the interaction.

A haptic device may be configured to output a haptic effect comprising a vibration, a change in a perceived coefficient of friction, a simulated texture, a change in temperature, a stroking sensation, an electro-tactile effect, or a surface deformation (e.g., a deformation of a surface associated with the system). Further, some haptic effects may use multiple haptic devices of the same or different types in sequence and/or in concert.

In some embodiments, the haptic device is configured to output a haptic effect comprising a vibration. The haptic device may comprise, for example, one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

In some embodiments, the haptic device is configured to output a haptic effect modulating the perceived coefficient of friction of a surface associated with the system. In one embodiment, the haptic device comprises an ultrasonic actuator. An ultrasonic actuator may vibrate at an ultrasonic frequency, for example 20 kHz, increasing or reducing the perceived coefficient of an associated surface. In some embodiments, the ultrasonic actuator may comprise a piezo-electric material.

In some embodiments, the haptic device uses electrostatic attraction, for example by use of an electrostatic actuator, to output a haptic effect. The haptic effect may comprise a simulated texture, a simulated vibration, a stroking sensation, or a perceived change in a coefficient of friction on a surface associated with the system. In some embodiments, the electrostatic actuator may comprise a conducting layer and an insulating layer. The conducting layer may be any semiconductor or other conductive material, such as copper, aluminum, gold, or silver. The insulating layer may be glass, plastic, polymer, or any other insulating material. Furthermore, the system may operate the electrostatic actuator by applying an electric signal, for example an AC signal, to the conducting layer. In some embodiments, a high-voltage amplifier may generate the AC signal. The electric signal may generate a capacitive coupling between the conducting layer and an object (e.g., a user's finger, head, foot, arm, shoulder, leg, or other body part, or a stylus) near or touching the haptic device. Varying the levels of attraction between the object and the conducting layer can vary the haptic effect perceived by a user.

In some embodiments, the haptic device comprises a deformation device configured to output a deformation haptic effect. The deformation haptic effect may comprise raising or lowering portions of a surface associated with the system. For example, the deformation haptic effect may comprise raising portions of a surface of an object to generate a bumpy texture. In some embodiments, the deformation haptic effect may comprise bending, folding, rolling, twisting, squeezing, flexing, changing the shape of, or otherwise deforming a surface associated with the system. For example, the deformation haptic effect may apply a force on the system or a surface associated with the system, causing it to bend, fold, roll, twist, squeeze, flex, change shape, or otherwise deform.

In some embodiments, the haptic device comprises fluid configured for outputting a deformation haptic effect (e.g., for bending or deforming the system or a surface associated with the system). For example, the fluid may comprise a smart gel. A smart gel comprises a fluid with mechanical or structural properties that change in response to a stimulus or stimuli (e.g., an electric field, a magnetic field, temperature, ultraviolet light, shaking, or a pH variation). For instance, in response to a stimulus, a smart gel may change in stiffness, volume, transparency, and/or color. In some embodiments, stiffness may comprise the resistance of a surface associated with the system against deformation. In some embodiments, one or more wires may be embedded in or coupled to the smart gel. As current runs through the wires, heat is emitted, causing the smart gel to expand or contract. This may cause the system or a surface associated with the system to deform.

As another example, the fluid may comprise a rheological (e.g., a magneto-rheological or electro-rheological) fluid. A rheological fluid comprises metal particles (e.g., iron particles) suspended in a fluid (e.g., oil or water). In response to an electric or magnetic field, the order of the molecules in the fluid may realign, changing the overall damping and/or viscosity of the fluid. This may cause the system or a surface associated with the system to deform.

In some embodiments, the haptic device comprises a mechanical deformation device. For example, in some embodiments, the haptic device may comprise an actuator coupled to an arm that rotates a deformation component. The deformation component may comprise, for example, an oval, starburst, or corrugated shape. The deformation component may be configured to move a surface associated with the system at some rotation angles but not others. The actuator may comprise a piezo-electric actuator, rotating/linear actuator, solenoid, an electroactive polymer actuator, macro fiber composite (MFC) actuator, shape memory alloy (SMA) actuator, and/or other actuator.

Further, other techniques or methods can be used to deform a surface associated with the system. For example, the haptic device may comprise a flexible surface layer configured to deform its surface or vary its texture based upon contact from a surface reconfigurable haptic substrate (including, but not limited to, e.g., fibers, nanotubes, electroactive polymers, piezoelectric elements, or shape memory alloys). In some embodiments, the haptic device is deformed, for example, with a deforming mechanism (e.g., a motor coupled to wires), air or fluid pockets, local deformation of materials, resonant mechanical elements, piezoelectric materials, micro-electromechanical systems ("MEMS") elements or pumps, thermal fluid pockets, variable porosity membranes, or laminar flow modulation.

In some embodiments, the haptic device is configured to remotely project haptic effects to a user. For example, the haptic device may comprise one or more jets configured to emit materials (e.g., solids, liquids, gasses, or plasmas) toward the user (e.g., toward the back of the user's hand). In one such embodiment, the haptic device comprises a gas jet configured to emit puffs or streams of oxygen, nitrogen, carbon dioxide, or carbon monoxide with varying characteristics upon receipt of the haptic signal. As another example, the haptic device may comprise one or more ultrasonic transducers or speakers configured to project pressure waves in the direction of the user. In one such embodiment, upon the user interacting with an object, the system may cause the haptic device to emit a concentrated pressure wave toward the user. The concentrated pressure wave may vibrate a portion of the user's body (e.g., the user's hand).

Sensor Based Embodiments

Figure 3:
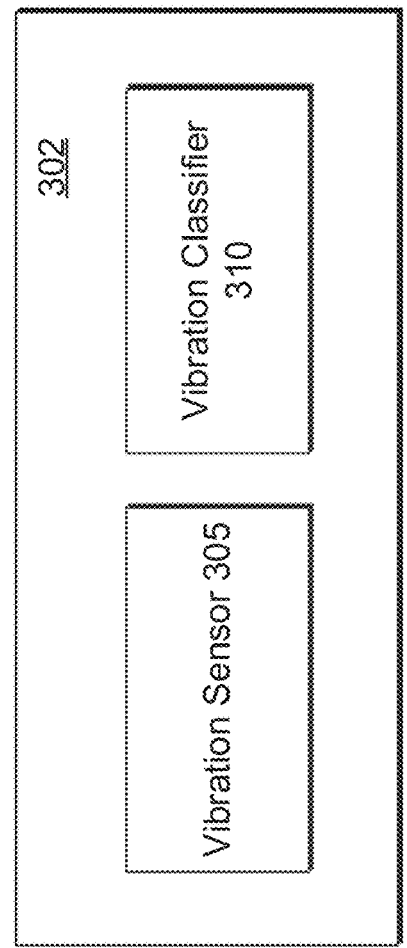
FIG. 3 illustrates components of a system for sensor-based detection of tactile interactions with the environment, according to an embodiment.

One embodiment of main components of a system for a sensor-based approach is illustrated in FIG. 3. The system 302 may comprise a vibration sensor 305 and a vibration classifier 310.

Vibration Sensor 305 may detect interactions between the hand and an object through vibrations. In an embodiment, the vibration sensor comprises an accelerometer, such as embedded in a smart watch, a smart ring, or fitness tracker. As the user interacts with objects having different physical properties, different vibration patterns are produced on the accelerometer (or other vibration sensor). In some embodiments, the vibration sensor may comprise an alternative sensor, such as a microphone (for example, a microphone in a smart ring may detect particular sounds as a user's finger brushes against a particular textured surface—like a brick wall as opposed to a wood wall).

Vibration Classifier 310 may comprise a software component which analyses the vibrations produced and estimates the material properties of the object touched and the gesture performed against it.

In some embodiments, rules for vibration classification may utilize a weighted sum of the likelihoods, which may give more weight to more reliable classifiers. The weights may be set dynamically, e.g., by having one or more classifiers report their confidence in current conditions. In other embodiments, a threshold for vibration determination by a classifier may be dynamic or otherwise variable. For example, the threshold may be set higher if a particular vibration pattern (either independently or in association with a particular detected user motion, such as a hand stroke against a brick wall as opposed to a hand stroke on a wood wall) is associated with a serious (perhaps irreversible) action, such as releasing a "virtual creature" or executing a financial transaction.

Figure 4:
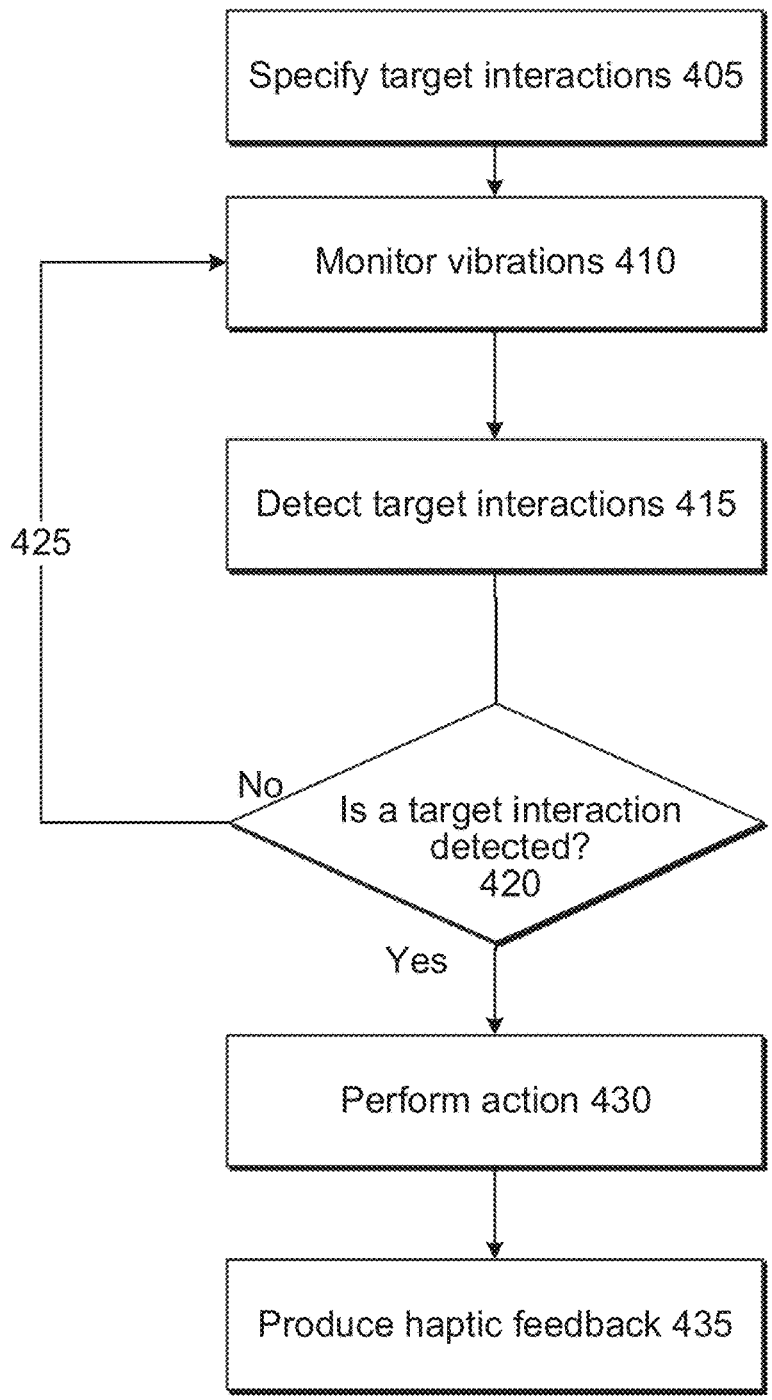
FIG. 4 illustrates a flow chart for sensor-based detection of tactile interactions with the environment, according to an embodiment.

FIG. 4 illustrates a flow chart of one embodiment of a sensor-based approach. In an embodiment, the system may specify target interactions 405. For example, the AR application may specify the target interactions given a current state of the software. Target interactions may include combinations of gesture and material properties that are likely to be detectable, such as tapping against a hard surface, brushing against a rough surface, poking a soft object, or the like. The system may then monitor vibrations 410. Vibration data is collected by the vibration sensor. The system may then detect target interactions 415. The vibration classifier may be used to detect whether any of the target interactions has been detected. This may be similar to the classification of gestures, as described above. The classification algorithm may be trained using machine learning techniques to detect various vibrations patterns that result from specific interactions with specific objects. The system may, for example and without limitation, be trained to detect brushing against a brick wall. The classification algorithms used in some embodiments may be similar to those discussed in Romano and Kuchenbecker and Gao.

The system may then determine whether a target interaction has been detected 420. If not, the system may keep monitoring vibrations until a target interaction is detected 425. If a target interaction is detected, the system may perform an action 430. In an embodiment, the system may have information which specifies the action that results from the detected interaction. In some embodiments, step 430 may be similar to step 240 from FIG. 2.

In some embodiments, the system may optionally produce haptic feedback 435. In some cases, this feedback may be similar to step 245 from FIG. 2. Haptic feedback may be produced on any haptic device in contact with the body of the user, including on a wearable band or on AR glasses. Any haptic technology may be used, including vibration, deformation, electrical stimulation, stroking, squeezing, variations in temperature, a change in the perceived coefficient of friction, and/or the like. The haptic feedback may indicate that a target interaction is being detected (e.g., a continuous vibration), or that a target interaction has been detected and has trigged an action (e.g., a brief, sharp vibration). The haptic feedback may also be tied to virtual content that is part of an AR simulation.

In some embodiments, the location based and sensor based approaches may be combined. In some cases, this may result in improved outcomes for the system. In an embodiment, the "target interaction" of the sensor-based approach may be specified by querying the object database of the location-based approach for nearby interactions of interest. The classification resulting from each approach may similarly be fused to produce more accurate results. A combined likelihood of a gesture may, for example, be obtained by taking a maximum, average, or a minimum of the likelihoods produced by the location-based and sensor-based approaches (or a weighted sum combination, wherein the weight of a given classifier may be predetermined or dynamic, such as based on a confidence of the classifier result). Alternatively, the sensor-based approach may be executed only when a gesture has been detected by the location-based approach in order to confirm the classification, thereby reducing computational requirements.

Figure 5A:
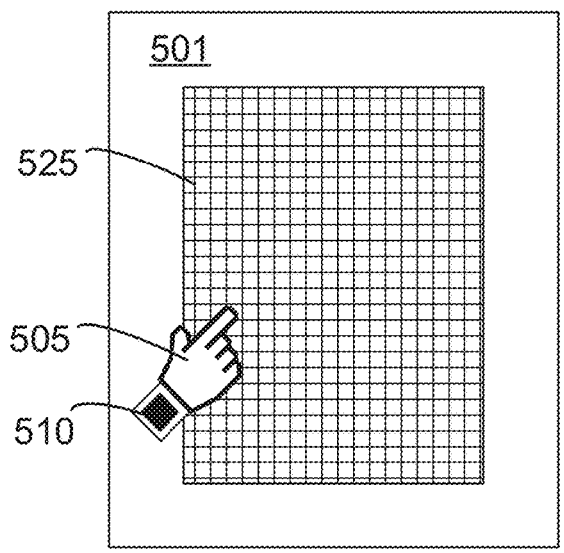
FIGS. 5A-5C illustrate an exemplary embodiment of an AR user experience.
Figure 5B:
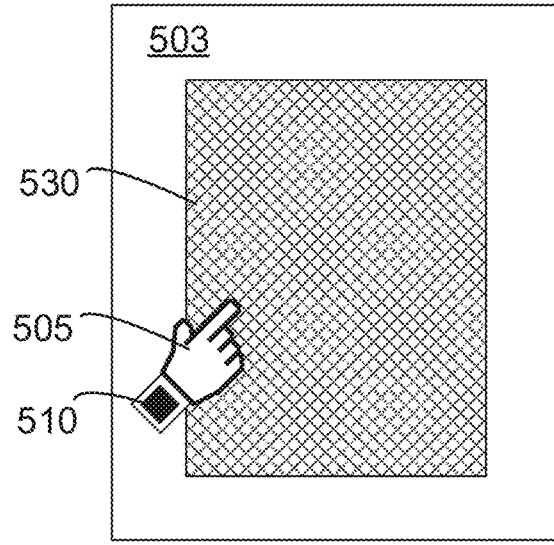
Figure 5C:
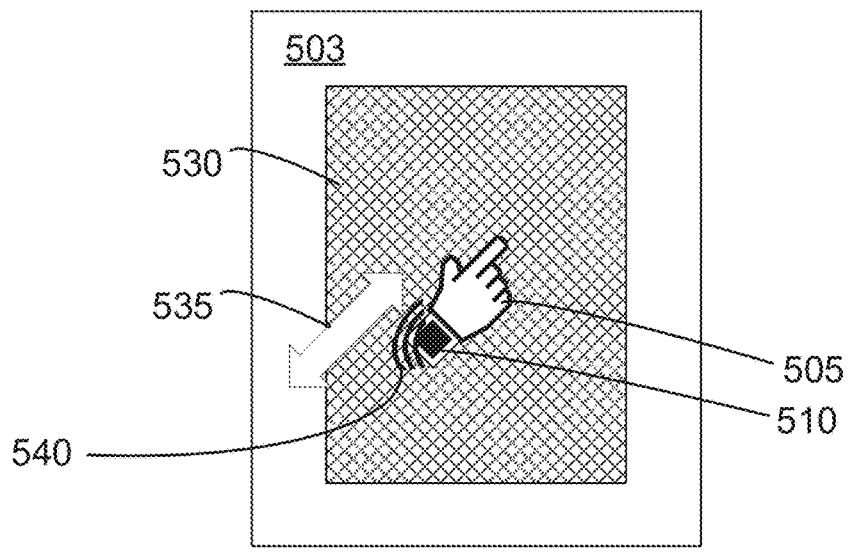

In an exemplary embodiment, as illustrated in FIGS. 5A-5C, a user may be wearing an AR device and interacting with an environment. As shown in FIG. 5A, within a user's real-world field of view 501 may be a brick wall 525. The user may also see their own hand (505), and be wearing a smartwatch 510. The smartwatch 510 may include a vibration sensor component and a haptic feedback component. The smartwatch 510 may be in communication with the user's AR device. In an AR view 503 presented to the user, as shown in FIG. 5B, the brick wall 525 may be overlaid with an AR object, such as a virtual textured surface 530. The virtual textured surface 530 may, for example, be covered in virtual "fur." As previously discussed, the AR device (or another device or sensor in communication with the AR device) may determine the user's location (or geolocation), and the AR device may retrieve information identifying the brick wall 525, a stroking motion of the user's hand associated with the brick wall 525, an AR program action associated with the stroking motion of the user's hand, and a haptic feedback response to simulate touching fur. In one instance, the AR environment presented to the user may be part of an AR game, and the user may stroke their hand against AR objects to collect materials within the game. In this case, the program action associated with the user stroking their hand against virtual fur (530) may be to collect the virtual fur (which may be later used in the AR game).

As shown in FIG. 5C, the user may move (535) their hand against the real-world brick wall 525 with the overlaid virtual fur texture 530 in the stroking motion associated with the brick wall. This movement (535) may be detected by one or more sensors in communication with the AR device. The detected movement may then be matched to the predefined stroking motion of the user's hand. If there is more than one retrieved predefined gesture, the system may determine which gesture the detected movement matches, if any. The detected movement may be evaluated in some instances by a classification algorithm to determine a likelihood that the detected movement matches a given predefined gesture. Here, as the detected movement is matched to the predefined stroking motion of the user's hand, the program action and haptic feedback response associated with the stroking motion may be selected and executed. As such, the AR device may collect the virtual fur as the user moves their hand against the real-world brick wall with the virtual fur texture AR overlay, and the haptic feedback response (540) to simulate touching fur may be generated and controlled by the haptic feedback component of the smartwatch.

Various instances may further include retrieving locations (or geolocations) of real-world objects, textures associated with real-world objects, vibration profiles of predefined gestures (such as associated with a particular motion, a particular motion on a particular texture, etc.), and/or the like.

In some further instances, a vibration sensor, such as a component of the smartwatch 510, may detect vibrations caused by the user's tactile interactions with real-world objects such as the brick wall 525. In some cases, these vibrations may be used in identification of a gesture being performed by the user (e.g., is the user stroking their hand on a brick wall or a wood-paneled wall). Detected vibrations may also be used in identification of a particular real-world object being interacted with by the user (e.g., if the user is within a threshold distance of a real-world object, detected vibrations may be used to determine that the user is touching an object, so the user must stroke the real-world wall, not just perform the motion in the air).

In various instances, such as where the haptic feedback response simulates a virtual texture, detected vibrations from the user's interaction with the real-world object may be factored into the control of the haptic feedback component generating the haptic feedback response. For example, the vibrations generated by the user stroking their hand on the brick wall may increase or decrease an intensity or strength of a particular haptic feedback response as a virtual fur texture is simulated.

In an alternative scenario, rather than a brick-wall, the real-world object may be a smooth plaster wall. And rather than a simulated virtual fur texture, the simulated texture may be a simulated virtual brick wall texture. In such a scenario, the haptic feedback response 540 may control the haptic feedback component to simulate the feel of a brick wall (the virtual texture), such as with controlled vibrations or other haptic feedback.

Figure 6:
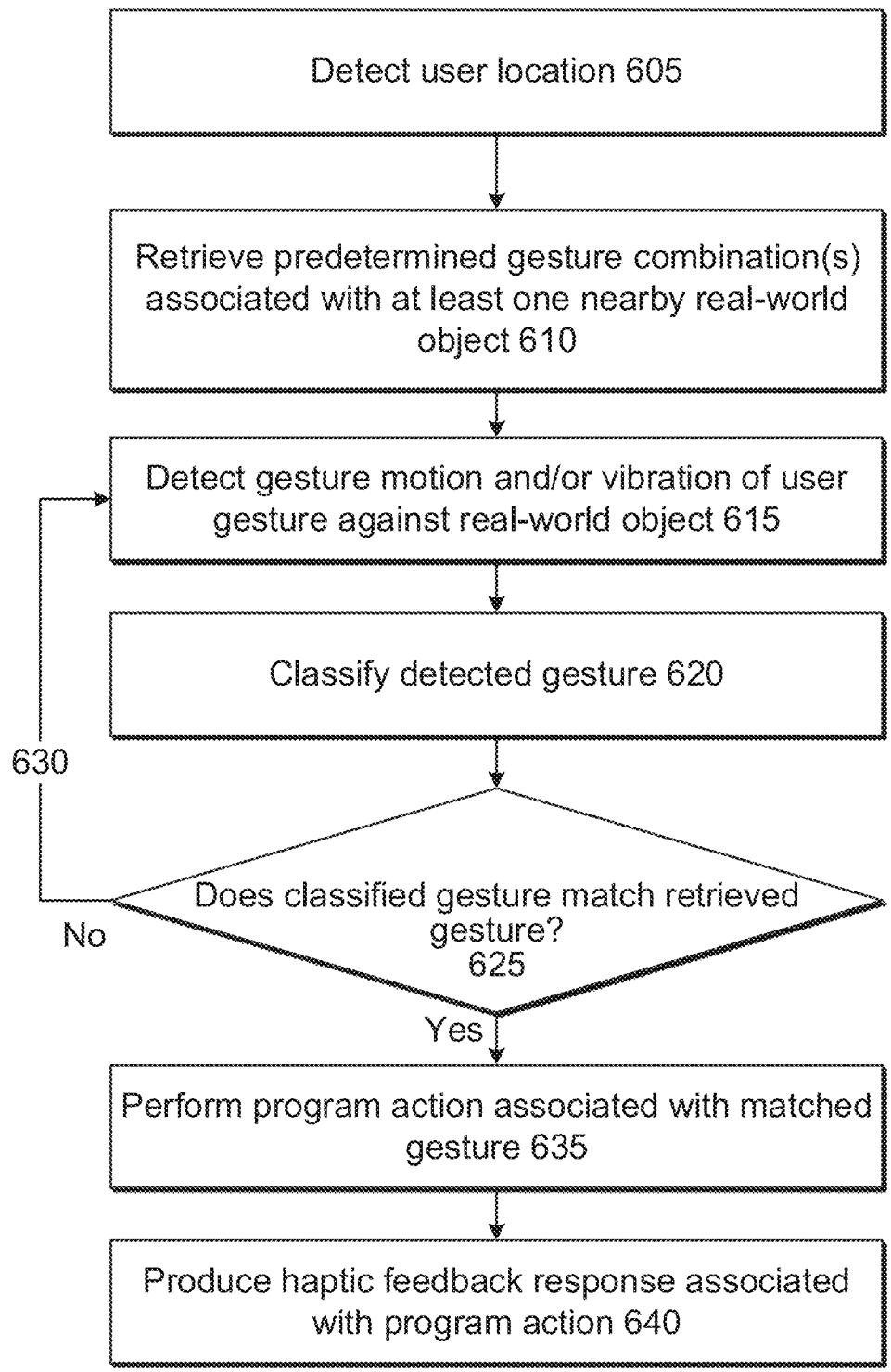
FIG. 6 illustrates a flow diagram for an exemplary embodiment set forth herein.

FIG. 6 illustrates a flow diagram for an embodiment such as that in FIGS. 5A-5C. At some point, the user location may be detected (605), and based on the determined location of the user the user's mobile device may retrieve from a database or remote server information (610) identifying gesture combinations, which may each comprise (i) at least a first nearby real-world object, (ii) at least a first predefined gesture associated with the first real-world object, and (iii) at least a first program action associated with the first predefined gesture. In some embodiments, the mobile device may also retrieve at least a first haptic feedback response associated with the first program action. Gesture detection may operate to track the movements of the user, and at some point a gesture motion of the user may be detected (615). The detected gesture motion may in some embodiments also include detected vibrations of the user's tactile interaction with a real-world object. Based on the detected gesture motion, classification of the detected gesture may be attempted (620), such as with a classification algorithm as previously discussed. If the classified gesture matches a retrieved predefined gesture (625), the associated program action associated with the matched gesture may be performed (635). In some embodiments, where a haptic feedback response associated with the program action is also retrieved, the retrieved haptic feedback response may also be produced, generated, or otherwise controlled (640). If the detected gesture does not match a retrieved gesture, then gesture detection and classification processes may be repeated. In some embodiments, the location of the real-world object may also be retrieved, and utilized in evaluating or classifying detected gesture motions.

Further Embodiments

In some embodiments, systems and method disclosed use an accelerometer placed near the hand, such as in a smartwatch or activity tracker. However, in other embodiments, there may be several other possibilities for gesture detection. For example, gesture sensing technologies may include computer vision used to detect motion of the hand, with or without fiducial markers. The motion of the hands may also be tracked using electromagnetic markers. Gestures may also be inferred from muscle activation. A graspable device, such as a wand-like game controller, may also be used to detect gestures.

In some embodiments, the sensor-based approaches discussed above rely on an accelerometer to sense the properties of the material being touched. In other embodiments, it may, however, also be possible to identify the material using other sensors such as a wearable camera or a radar-based sensor (for example as discussed in Yeo, et al., "*RadarCat: Radar Categorization for Input & Interaction.*", *Proceedings of the 29th Annual Symposium on User Interface Software and Technology*, 833-841).

In some embodiments, data about tactile gestures being made and the material properties of objects being touched may be geo-localized and collected at a cloud server for utilization. This data may be used to build and continuously improve a database of expected gestures and material properties at different locations. The database may, for example, be initialized with a generic model for the vibration pattern expected from brushing against a wall. As brushing gestures are detected against a specific wall, the vibration patterns recorded can be uploaded to the database and used to re-train the model for this specific wall. Over time, the database may learn and improve its recognition of gestures against this specific wall. In some cases, the threshold for detection may initially be set low, and gradually increase as detection accuracy is improved with additional data.

While systems and methods set forth herein are described primarily in relation to visual AR embodiments, such as AR glasses and smartphones, in some other embodiments the systems and methods may also or alternatively be used without any visual feedback. An AR application may instead provide cues and feedback with either audio or haptic feedback, or both. A player, for example, may feel different surfaces in his environment until a specific haptic sensation is produced on his smartwatch, indicating that a virtual item has been picked up and points collected. Similarly, the player may be prompted to explore his environment using spoken audio (e.g., "look for a brick wall!") and sound effects (e.g., a 'pop' sound when an item is picked up). The source of the sound may be on the user's body (e.g., headphones, wearable speaker) or in the environment (e.g., a stationary speaker).

In some embodiments, systems and methods set forth herein may be extended to facilitate the alignment of virtual content to real objects. Detected tactile gestures may contain information that can be used for registration. More specifically, a real environment may limit the movements of a user in ways that can be captured within the methods set forth herein. A brushing motion against a wall, for example, may reveal the orientation of the wall relative to the user and allow virtual content to be placed on it. Similarly, tapping against the wall may reveal the location of at least one point of contact. In some cases, the visual motion in a video feed may be correlated with a registered interaction.

In some embodiments, the systems and methods set forth herein may be applied to VR use cases. For example, a sensor-based approach may be used to detect interactions with objects in the real world while a user is immersed in a VR environment. These interactions may trigger actions in the VR environment, or be mapped to interactions with matching virtual objects. When detecting that the user is touching a wall, for example, the VR simulation may display a virtual wall that is only visible when touched. Touching a keyboard, on the other hand, may pop-up a typing window. A location-based approach may be incorporated in a context where a VR environment matches physical objects in the real world, such as by mapping every wall, door, or other object in the real environment to virtual objects in the VR environment. Tactile gestures may then be detected as described above, and mapped to actions in the virtual environment. The augmentation of tactile interactions with artificial haptic feedback may also be utilized in VR use cases. Real world objects may, for example, be used as props for VR objects and augmented with tactile feedback that improves realism. Vibrations simulating a rough surface may, for example, be produced when touching a smooth table that is shown to be rough in a VR environment.

In one exemplary scenario, a player may open an AR game app on their smartphone. A tip may pop-up on the screen: "Monsters hide in trees . . . Can you find one?" The user may start walking and look for a tree. Once a tree is found, the user may stop in front of it and brush their hand against the tree trunk. They may feel a vibration of increasing intensity on their smartwatch, and then a "pop" once a monster has been found. In a location-based approach, the app may monitor a GPS signal of the smartphone and query an online database for nearby trees. When a tree is detected within reach of the player (given the resolution of the GPS signal), the app begins monitoring the accelerometer signal from the player's smartwatch. The app looks for a motion pattern that matches brushing against a tree trunk. If the pattern is detected, a counter begins and a command is sent to the watch to output a vibration pattern indicating progress. Once the counter has reached a preset level (e.g., 5 seconds), another command is sent to the watch to produce a vibrating pop and the app releases the virtual creature on the screen. In a sensor-based approach, the app may monitor the signal from an accelerometer inside the user's smartwatch. The signal may be processed by an algorithm to determine the likelihood that a tree trunk is being touched. Vibration patterns may be produced on the watch when a matching pattern is first detected, and also once the pattern has been ongoing for a preset amount of time. In a combined approach, the app may monitor a GPS signal of the smartphone and query an online database for nearby trees. When a tree is detected within reach of the player (given the resolution of the GPS signal), the app begins monitoring the accelerometer signal from the player's smartwatch in order to detect brushing against the tree. The algorithms from the location-based approach are used to determine the likelihood that the motion pattern matches brushing against the tree's trunk, as described above. The algorithms from the sensor-based approach are used to determine the likelihood that the vibration pattern matches brushing against the tree's trunk, as described above. Both likelihoods are combined to determine a single likelihood, such as by taking the average or minimum of the two likelihoods obtained with the location-based and sensor-based approaches. Vibration patterns are once again produced on the watch when a matching pattern is first detected, and once it has been ongoing for a preset amount of time.

In some additional scenarios, once the app detects that the player is touching the bark of a tree, it may decide whether or not a monster is hiding in this tree, for example either randomly or using a database. If a monster is not present, no action will be taken. If a monster is present, a vibration pattern may be produced on a watch whenever the player's hand crosses roughly the center of the gesture area, giving the illusion of a localized object. In one case, after three repetitions, the monster may be released in the app.

The release of a monster may be triggered by a wide range of tactile gestures against objects in the environment, such as: tapping or brushing against a tree's trunk; running a hand through a tree or bush's branches; running a hand through grass, sand, or water; tapping or brushing against a statue in a park; knocking on a wall or door; brushing against a surface with a distinctive texture such as a brick wall, a wooden bench, a tree or a plant.

In another exemplary use case, a user may open an AR Tourism app on their smartwatch and walk into a park. As they slide their hand around a statue at the center of the park, they may feel a vibration on their watch and look at it to see a description of the statue and its historical significance. In a location-based approach, the app monitors the GPS signal of the smartphone and queries an online database for nearby points of interest. Whenever a point of interest is within reach, the app queries the database to retrieve predefined gestures which may be performed against the point of interest. It then may monitor an accelerometer signal of the smartwatch to determine whether one of the retrieved gestures is being performed. When a retrieved gesture is detected, further retrieved elements (such as a program action and an optional haptic feedback response each associated with the predefined gesture and/or real-world object) may be executed.

In another exemplary use case, systems and methods set forth herein may be utilized in an internet of things (IoT) transaction. For example, a user may open a music playing app on their smartphone. While holding a virtual button in the UI, they may touch a nearby speaker to start music playing from that speaker. In a combined approach, the music app may use the GPS signal of the phone to determine what speakers are nearby and their physical properties. It may then use an accelerometer in the smartwatch to monitor vibrations resulting from the user's contact with an object. When a contact is detected, the signal may be processed to determine material properties of the contacted object. If these match a nearby speaker, that speaker may be selected to play the music.

Still further use cases may utilize the systems and methods set forth herein. For example, certain objects in an environment may deliver information hectically when touched. For example, when it is detected that a user has grabbed a pole for a bus sign (such as by location evaluation of the user and the pole, and vibration detection to confirm the user has touched the pole), a time until the next bus may be displayed on the user's smartwatch, and the smartwatch may vibrate to draw the user's attention to the displayed wait time. Similarly, to assist vision or hearing impaired users, detection that the user has touched or grabbed a pole or post at an intersection with a crosswalk may retrieve (if available to the device) a current status of a crosswalk indicator and provide a haptic feedback response to the user for that current status (e.g., a sequence of vibrations if it is not time to cross, or a continuous vibration when the walk signal is active that may change in intensity as the time of the walk signal counts down).

Objects in an environment may also be used as waypoints in a game, during exercise, or the like. A runner, for example, may touch a tree or other specific object in the environment as a target marker and feel feedback about their performance. For example, a tap gesture against a solid real-world object may be associated with a program action to record a lap time for the runner and compare that lap time to a pace preset by the runner, and a haptic feedback response may deliver alternative vibration sequences for whether the runner met or beat the pace time or was slower than the pace time.

Making a gesture against an object may also trigger an action, either in the physical or digital world. Haptic feedback can provide guidance (e.g., indicate that the gesture is possible, that it is being detected, or what action will result) or confirm that the action has been triggered. Examples of actions include, but are not limited to: opening or unlocking a door or container; controlling the intensity of a light, a sound, a water flow, a heating element, etc.; using objects as a remote control; information queries; and/or the like.

For example, opening or unlocking a door or container may have predefined triggering gestures including but not limited to: sliding a hand or foot upwards against a garage door to open it; sliding a hand horizontally against a sliding door to open it; making a rotating gesture against a lock to unlock it; sliding a hand down against a car window to open it; etc. In one case, when it is detected that the user has moved their hand upwards against a garage door, a retrieved predefined gesture of the upwards hand movement associated with the garage door may have an associated program action to open the garage door. Alternatively, a downward hand motion against a wall next to the garage door may be associated with a program action to close the garage door, and may be similarly executed based on detection of the downward hand motion.

For example, controlling the intensity of a light, a sound, a water flow, a heating element, or the like may have predefined triggering gestures including but not limited to: sliding a hand against a light post to adjust the light intensity; sliding a hand against a wall next to a bathtub to control water flow; sliding a hand up and down a wall to control the lighting in a room; controlling the volume of outdoor speakers in a backyard by sliding a hand up and down a tree; moving a hand in the water next to a pool's water jet to activate them; etc.

For example, using a nearby object as a remote control may have predefined triggering gestures including but not limited to: sliding a hand against a sofa to change the channel or control the sound on a television; extending a game console controller to other objects in the room, e.g., tapping against the coffee table or sofa; gesturing against street furniture (e.g., a mailbox) to interact with a large screen display (e.g., Times Square); allowing a crowd of people to play music together by interacting with street furniture and other objects in a public space, e.g., control percussion by tapping against a bench or the pitch of a sound by touching a statue; etc.

Other examples of actions and their predefined trigger gestures include but are not limited to: gesturing against a table or menu in a restaurant to call the waiter; gently tapping twice on a shared car (e.g., car2go) to start using it; making a specific gesture against street furniture (e.g., a lamp post) to order a private car service (e.g., Lyft or Uber) at that location; paying for a parking meter by tapping twice against your car or against the park meter; interacting with an advertisement (e.g., a video display in a bus shelter) by touching nearby objects (e.g., touching the walls of the bus shelter); etc.

To perform an information query, an object may be touched or interacted as the predefined gesture to trigger the display of information. In various cases, the display can be visual (e.g., a pop-up display in AR), audio (e.g., an audio recording or computer-generated voice), or haptic (e.g., a vibration or sequences of vibrations that communicate a particular meaning). In various scenarios, an information action and its predefined trigger gesture may include but are not limited to: touching a door, window or wall to indicate if someone is inside, if the person inside is busy, if a store is open, etc.; touching an umbrella, an item of clothing, or a door indicates the weather, e.g., whether umbrella or a warm jacket is needed; touching a post or traffic light at an intersection indicates whether it is safe to cross, e.g., for visually impaired pedestrians; touching a bus shelter or a bus stop sign indicates when the next bus is coming; touching a product in a store indicates whether it should be purchased based on price comparisons, home inventory, or other criteria; touching a plant indicates whether it should be watered, based on IoT sensors or the like; touching a picture frame triggers a recorded message or opens a chat window with the person in the picture; touching an advertisement (e.g., a poster) opens up a video or webpage; touching the water in a pool indicates the water's temperature, its chlorine level, etc.; and/or the like.

In some cases, gestures against objects can be used to establish links or transactions between multiple devices and/or objects. Haptic feedback can confirm that the objects have been selected and that a link or transaction has been established or concluded. A distinct vibration can, for example, be produced to indicate each event. Examples include but are not limited to the following. Touching an audio-video source and a playback device to link them: for example, display a video stored on a camera on a television by first touching the camera and then the television; play music from a smartphone on wireless speaker by touching the smartphone with one hand and the speaker with the other; etc. Making a payment by touching the source of the money or a proxy for it (e.g., a credit card, a wallet) and then touching the payment system (e.g., a vending machine, a card reader).

In addition to previously described examples, in some cases systems and methods disclosed herein may be used in interactive tactile games which involve having people hide virtual objects in the environment and having others look for them by touch (for example), with hints. For example, a player could hide a virtual object in a tree and tell another player that it is hidden in something rough and brown. A game played in the real world may similarly provide clues about a player's whereabouts with haptic feedback that can be felt by touching objects. When playing hide-and-seek, for example, a player may feel whether another player has been somewhere and how long ago by feeling haptic feedback in their shoes as they touch the ground. This information may, for example, be indicated using a vibrotactile or thermal haptic effect that diminishes in intensity based on the time since another player has been at a location. AR games may be controlled by interacting with objects in the environment. For example, a boat projected on a water puddle may be played with by making gestures in the water with a hand or foot, and haptic feedback may be felt in a user's smartwatch. In a particular case, a user may make gestures in the water, and the system may use either the location or the vibrations that are produced to deduce that the gestures are being made in the water, and map these gestures to direction and speed controls of the projected boat. Haptic feedback may be produced on the user's smartwatch to simulate the motor of the boat or the feel of water against its hull. In another use case, a player may use a game controller or objects in the room around the player to interact with a console game. For example, a door can be kicked down in the game by the player gently kicking against a coffee table or the floor. Or spells can be cast by making gestures against the surface of the sofa where the user is sitting. The system may have a map of the room and/or physical properties of the nearby objects, and can use the information to detect gestures against them. A sensor in a shoe, for example, can detect kicking the floor or a coffee table. Sensors in a wristband can detect brushing against the sofa. These actions are mapped to functions in the game, and haptic feedback can be used to confirm the action or simulate it more realistically.

AR may also be used to present promotional haptic AR scenarios. For example, a retail store chain may run a promotion where as people pass by one of its physical stores, they can make a circular gesture against the store's window to get a chance to win a rebate coupon. As people make the gesture, they may feel a scratchy texture that gradually goes away, similar to a real-world scratch-off lottery ticket. In some cases, if they've won, a sensation may be felt similar to a coin against a scratch-off ticket once the scratchy texture has been removed. If people are wearing AR glasses, they may also see AR representations of the scratch-off surface and the "coin" as they make the circular gesture against the window. Embodiments such as this do not call for a storefront to be instrumented in any way, utilizing information accessible to user devices to present the promotional haptic AR scenario. As the user gets close to the store's window, his watch detects his position and queries a database to know whether a store of the retail chain is nearby. In fact, the embodiment could even be applied to the stores of competitors. When the user makes a gesture against the window, an accelerometer in the wristband detects the circular gesture and an algorithm concludes that the gestures must be made against the window based on its orientation and proximity. The device then produces vibrations that simulate the feel of a scratch surface with diminishing intensity. It queries a server of the retail chain that determines whether or not the user has won. If it has, it produces a haptic effect that resembles a coin. If not, it stops producing haptic feedback. In other cases, an alternative promotion may involve a user finding a phone booth and rubbing their hand against it to win free air time from a wireless provider. In another example, a promotion from a music streaming company may involve rubbing a hand against different objects to hear music related to that object (e.g., a song about a bridge when touching it) and a chance to win a prize.

In another use case, systems and methods set forth herein may be used for interactive advertisements. For example, a user may approach a poster for a new racing console game. Based on their location and a database storage having a gesture associated with the poster, the user's mobile device may detect that the user is touching the poster (for example, based on the user's location, the location of the poster, and a vibration detection indicating an object has been touched). As they touch the poster, they may feel a haptic feedback response of a vibration on their phone as a webpage for the game is opened up on the phone. As they continue to move their hands on the poster, the user may also feel a haptic feedback response of a sequence of haptic effects (such as vibrations) on their smartwatch which may simulate the feel of the motor of a racecar. If the user is wearing AR glasses, they may also see that the poster is interactive, and a program action may be associated with the gesture of sliding their hands left or right on the poster or touching against a brick wall on its left or right to make an AR virtual car move on the interactive poster. Again, no additional instrumentation is called for beyond a user's own devices. A wearable or mobile device carried by the user detects their location and determines that they are close to the poster, and detects their gestures to determine whether a relevant input has been made against the poster (such as tapping, sliding against it, or sliding against the textured surface of the wall next to it). These gestures may trigger actions on the user's watch, smartphone, AR headset, or other device.

Systems and methods set forth herein may also be utilized in home automation, such as with IoT systems. Rather than controlling IoT systems with a screen based interface of their phone or other device, a user may more quickly control IoT system functionalities by touching objects in the environment to which specific functions are tied. For example, a garage door can be opened by brushing a foot upwards against it, which may be convenient when carrying bags. Or lights in a backyard may be dimmed by sliding a hand up and down against a tree, without the user walking over to a mechanical switch. Or water jets in a pool may be turned on or off by waving towards or away from the vents in the water. As in other use cases, the user's devices (and their sensors) are used to detect interactions based on the user's location and/or the texture of objects. A sensor in the user's shoes, for example, can detect brushing against the garage door, confirm based on the location of the user, and trigger opening of the garage door. In various cases, a vibration actuator (a particular type of haptic feedback component) in a wearable device (e.g., wrist or ankle band) may produce detents to indicate that a mechanism is being activated (e.g., different light settings) or a strong detent to indicate that something has been fully activated (e.g., opening of a door, especially if slightly delayed).

Systems and methods set forth herein may be used with car share programs to book a vehicle by a user finding an available vehicle and tapping against it twice, causing a system to automatically book the vehicle and unlock it for a user. Or with ride services, where a user may make a stored contact sequence (such as a simple 2 taps-pause-2 taps sequence) against any kind of street furniture to request a pickup, and the user may receive haptic feedback if a ride service car is selected to pick them up.

In an embodiment, there is a method of initiating a program action in an augmented reality after detecting a tactile interaction comprising: determining a location of a first user with at least one sensor of at least a first mobile device; retrieving at least a first object entry from an object database based on the determined location of the first user, the first object entry comprising an identifier of a first proximate object, at least one gesture action associated with the first proximate object, and at least one program action associated with each of the gesture actions; detecting a first gesture performed by the first user with at least one sensor of the mobile device; matching the detected first gesture to at least one gesture action in the first object entry; and executing the at least one program action associated with the matched at least one gesture action. The method may also include wherein the first object entry further comprises a haptic feedback response associated with at least one of the gesture actions. The method may also include executing the haptic feedback response associated with the matched at least one gesture action. The method may also include wherein the haptic feedback response indicates a gesture is being detected. The method may also include wherein the haptic feedback response indicates a gesture has been detected and the at least one program action associated with said gesture has been executed. The method may also include wherein the haptic feedback response is tied to virtual content which is part of an augmented reality environment generated by the mobile device. The method may also include wherein the haptic feedback response simulates a sensation of a virtual content object associated with the first proximate object. The method may also include dynamically adjusting the haptic feedback response to account for natural haptics produced by the first proximate object as the first user interacts with the first proximate object. The method may also include wherein the location of the first user is determined by a GPS sensor of the mobile device. The method may also include wherein the object database is local to the mobile device, or wherein the object database resides in the cloud. The method may also include wherein detecting the first gesture comprises detecting the first gesture with an accelerometer of the at least first mobile device. The method may also include wherein matching the detected first gesture to at least one gesture action in the first object entry comprises evaluating the detected sensor data of the first gesture with a classification algorithm to determine which of the at least one gesture action has a likelihood greater than a threshold value. The method may also include, responsive to a determination that at least two objects of interest are proximate to the first user and each is associated with a gesture action matched to the first detected gesture, executing the at least one program action of only the closest of the at least two objects of interest. The method may also include, responsive to a determination that at least two objects of interest are proximate to the first user and each is associated with a gesture action matched to the first detected gesture, executing the at least one program action of only the one of the at least two objects of interest which has a greatest likelihood as determined by a gesture classification algorithm. The method may also include enabling a gesture detection mode of the mobile device only when the first user is proximate to at least one object of interest. The method may also include wherein retrieving at least the first object entry from the object database based on the determined location of the first user comprises: calculating, for at least one object entry in the object database, a distance from said object to the first user's determined location; wherein the retrieved at least first object entry comprises at least one object entry having a calculated distance less than a predefined threshold value. The method may also include wherein the first object entry further comprises at least a first tactile interaction associated with the first object and at least one program action associated with the first tactile interaction. The method may also include detecting movements and vibrations caused by the first user interacting with the first object, with at least one sensor of the mobile device; and responsive to a determination that detected movements and vibrations indicate a particular tactile interaction has occurred, initiating a first program action associated with said tactile interaction in a memory of the mobile device. The method may also include wherein determining that detected movements and vibrations indicate the particular tactile interaction has occurred comprises evaluating the detected sensor data of the first user interacting with the first object with a classification algorithm to determine the particular tactile interaction of a plurality of tactile interactions which has a likelihood greater than a threshold value. The method may also include responsive to the determination, initiating a haptic response associated with said tactile interaction. The method may also include wherein a tactile interaction comprises a combination of gesture and material properties. The method may also include wherein a particular tactile interaction comprises the first user tapping against a hard surface, wherein a particular tactile interaction comprises the first user brushing against a rough surface, and/or wherein a particular tactile interaction comprises the first user poking a soft object. The method may also include wherein the at least one sensor of the mobile device comprises an accelerometer. The method may also include detecting movements and vibrations caused by the first user interacting with the first object, with at least one sensor of the mobile device. The method may also include wherein matching the detected first gesture to at least one gesture action in the first object entry comprises: evaluating with at least one classification algorithm likelihoods of the at least one gesture action based separately on each of the detected first gesture and the detected movements and vibrations; taking an average of the separate likelihoods; and selecting the first gesture action if the average of the likelihoods exceeds a threshold value. The method may also include wherein matching the detected first gesture to at least one gesture action in the first object entry comprises: evaluating with at least one classification algorithm likelihoods of the at least one gesture action based separately on each of the detected first gesture and the detected movements and vibrations; selecting the minimum value of the separate likelihoods; and selecting the first gesture action if the minimum value of the likelihoods exceeds a threshold value.

In one embodiment, there is a method, comprising: initiating detection mode of a mobile device to await detecting of a tactile interaction of a first user with a first object; detecting movements and vibrations caused by the first user interacting with the first object in a natural environment, with at least one sensor of the mobile device; and responsive to a determination that detected movements and vibrations indicate a particular tactile interaction has occurred, initiating a first program action associated with said tactile interaction in a memory of the mobile device. The method may also include determining a location of the first user with at least one sensor of the mobile device; and retrieving at least a first object entry associated with the first object from an object database based on the determined location of the first user; wherein the first object entry comprises at least a first tactile interaction associated with the first object, and at least the first program action associated with the first tactile interaction. The method may also include wherein the detection mode of the mobile device is initiated responsive to a determination that at least one object is proximate to the first user. The method may also include wherein a tactile interaction comprises a combination of gesture and material properties. The method may also include wherein a particular tactile interaction comprises the first user tapping against a hard surface, wherein a particular tactile interaction comprises the first user brushing against a rough surface, and/or wherein a particular tactile interaction comprises the first user poking a soft object. The method may also include responsive to the determination, initiating a haptic response associated with said tactile interaction. The method may also include wherein the at least one sensor of the mobile device comprises an accelerometer. The method may also include wherein determining that detected movements and vibrations indicate the particular tactile interaction has occurred comprises evaluating the detected sensor data of the first user interacting with the first object with a classification algorithm to determine the particular tactile interaction of a plurality of tactile interactions which has a likelihood greater than a threshold value.

In one embodiment, there is a system comprising a processor and a non-transitory storage medium storing instructions operative, when executed on the processor, to perform functions including: determining a location of a first user with at least one sensor of a mobile device; retrieving at least a first object entry from an object database based on the determined location of the first user, the first object entry comprising an identifier of a first proximate object, at least one gesture action associated with the first proximate object, and at least one program action associated with each of the gesture actions; detecting a first gesture performed by the first user with at least one sensor of the mobile device; matching the detected first gesture to at least one gesture action in the first object entry; and executing the at least one program action associated with the matched at least one gesture action.

In one embodiment, there is a system comprising a processor and a non-transitory storage medium storing instructions operative, when executed on the processor, to perform functions including: initiating detection mode of a mobile device to await detecting of a tactile interaction of a first user with a first object; detecting movements and vibrations caused by the first user interacting with the first object in a natural environment, with at least one sensor of the mobile device; and responsive to a determination that detected movements and vibrations indicate a particular tactile interaction has occurred, initiating a first program action associated with said tactile interaction in a memory of the mobile device.

Exemplary embodiments disclosed herein are implemented using one or more wired and/or wireless network nodes, such as a wireless transmit/receive unit (WTRU) or other network entity.

Figure 7:
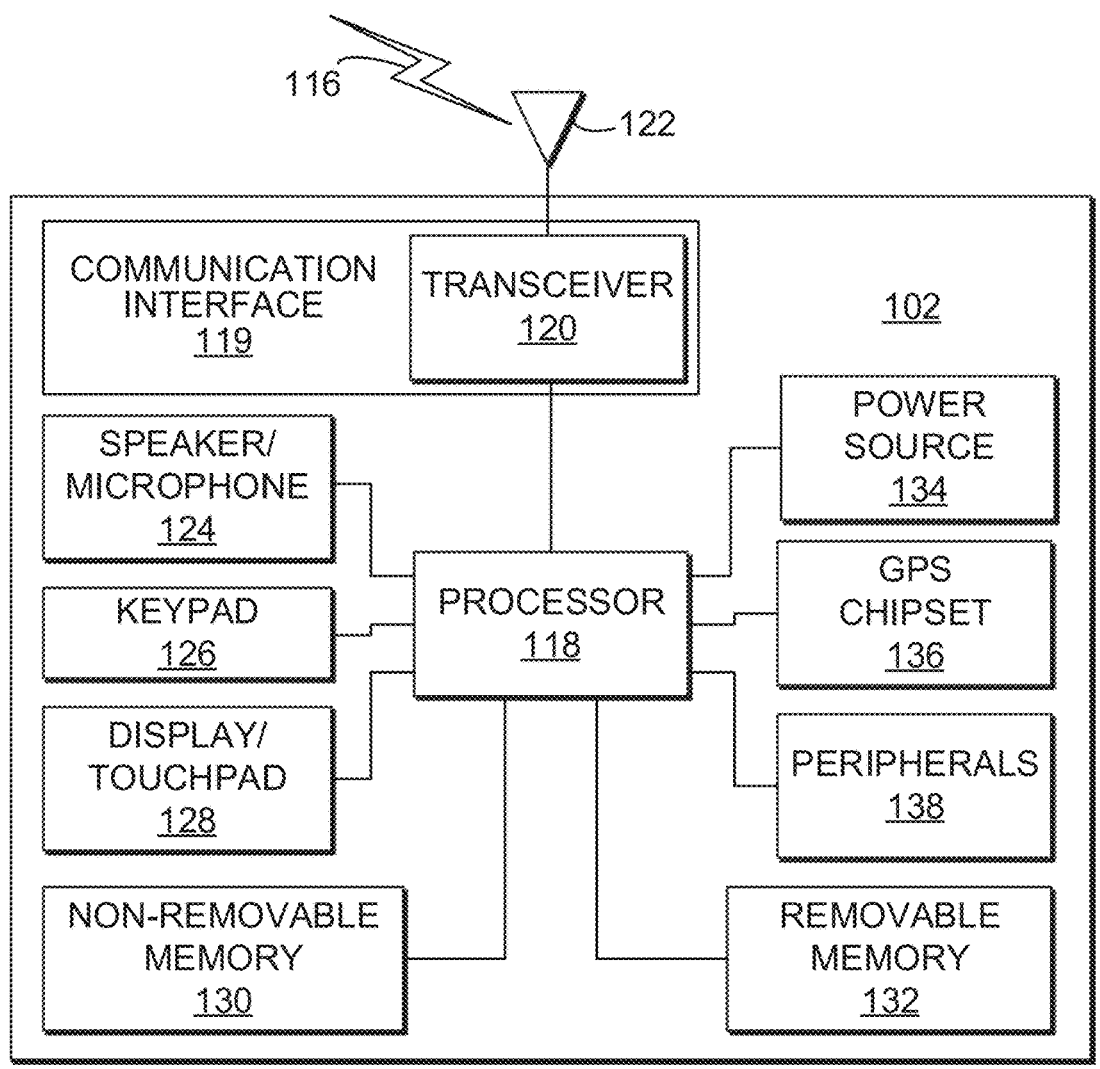
FIG. 7 illustrates an exemplary wireless transmit/receive unit (WTRU) that may be employed as a mobile device in some embodiments.

FIG. 7 is a system diagram of an exemplary WTRU 102, which may be employed as a mobile device (including wearable devices) in embodiments described herein. As shown in FIG. 7, the WTRU 102 may include a processor 118, a communication interface 119 including a transceiver 120, a transmit/receive element 122, a speaker/microphone 124, a keypad 126, a display/touchpad 128, a non-removable memory 130, a removable memory 132, a power source 134, a global positioning system (GPS) chipset 136, and sensors 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 7 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, as examples. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 7 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, as examples.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. As examples, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include sensors such as an accelerometer, an e-compass, a satellite transceiver, a digital camera (for photographs or video), a universal serial bus (USB) port, a vibration device, a haptic device or a haptic output device, a television transceiver, a hands free headset, a Bluetooth® module, a frequency modulated (FM) radio unit, a digital music player, a media player, a video game player module, an Internet browser, and the like.

Figure 8:
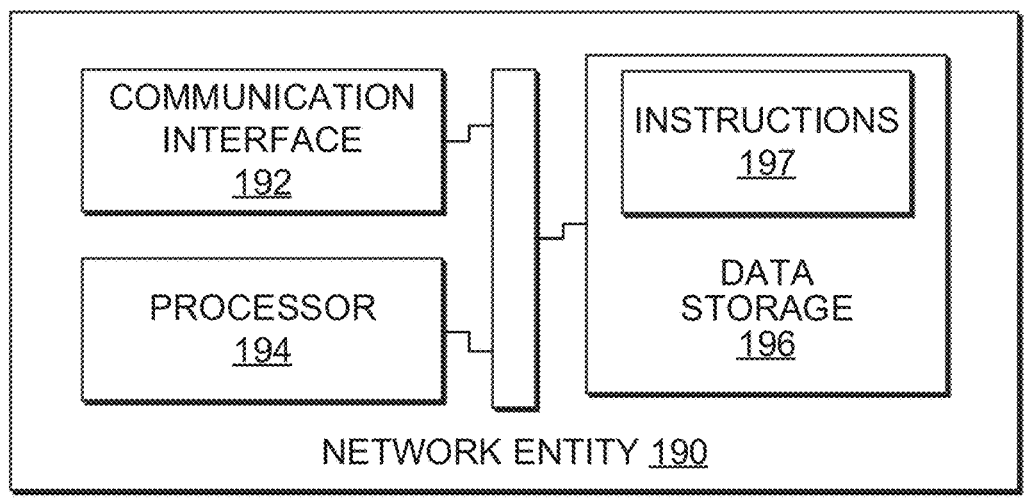
FIG. 8 illustrates an exemplary network entity that may be employed in some embodiments.

FIG. 8 depicts an exemplary network entity 190 that may be used in embodiments of the present disclosure. As depicted in FIG. 8, network entity 190 includes a communication interface 192, a processor 194, and non-transitory data storage 196, all of which are communicatively linked by a bus, network, or other communication path 198.

Communication interface 192 may include one or more wired communication interfaces and/or one or more wireless-communication interfaces. With respect to wired communication, communication interface 192 may include one or more interfaces such as Ethernet interfaces, as an example. With respect to wireless communication, communication interface 192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 192 may be equipped at a scale and with a configuration appropriate for acting on the network side—as opposed to the client side—of wireless communications (e.g., LTE communications, Wi Fi communications, and the like). Thus, communication interface 192 may include the appropriate equipment and circuitry (perhaps including multiple transceivers) for serving multiple mobile stations, UEs, or other access terminals in a coverage area.

Processor 194 may include one or more processors of any type deemed suitable by those of skill in the relevant art, some examples including a general-purpose microprocessor and a dedicated DSP.

Data storage 196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 8, data storage 196 contains program instructions 197 executable by processor 194 for carrying out various combinations of the various network-entity functions described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
using a location sensor to determine a current location of a user;
based on a list of objects and associated locations of the objects, determining whether the current location of the user is proximate to an object in the list of objects;
in response to the determination that the current location of the user is proximate to an object in the list of objects, begin monitoring a sensor of a wearable device to detect contact between the object and the user.

2. The method of claim 1, further comprising in response to a detection of contact between the object and the user, performing a program action associated with the object.

3. The method of claim 1, wherein monitoring the sensor of the wearable device to detect contact comprises monitoring the sensor of the wearable device to detect motion of the user against the object.

4. The method of claim 3, wherein monitoring the sensor of the wearable device to detect motion of the user against the object comprises comparing vibration detected by the sensor with a vibration profile.

5. The method of claim 1, wherein the sensor of the wearable device is an accelerometer.

6. The method of claim 1, wherein the sensor of the wearable device is a vibration sensor.

7. The method of claim 1, wherein determining whether the current location of the user is proximate to an object in the list of objects comprises determining whether an object in the list of objects is within reach of the user.

8. The method of claim 1, wherein the location sensor comprises a GPS sensor.

9. The method of claim 1, wherein the wearable device is a smart watch.

10. The method of claim 1, wherein the wearable device is a smart ring.

11. An apparatus comprising at least one processor configured to perform a method comprising:
using a location sensor to determine a current location of a user;
based on a list of objects and associated locations of the objects, determining whether the current location of the user is proximate to an object in the list of objects;
in response to the determination that the current location of the user is proximate to an object in the list of objects, begin monitoring a sensor of a wearable device to detect contact between the object and the user.

12. The apparatus of claim 11, further configured, in response to a detection of contact between the object and the user, to perform a program action associated with the object.

13. The apparatus of claim 11, wherein monitoring the sensor of the wearable device to detect contact comprises monitoring the sensor of the wearable device to detect motion of the user against the object.

14. The apparatus of claim 13, wherein monitoring the sensor of the wearable device to detect motion of the user against the object comprises comparing vibration detected by the sensor with a vibration profile.

15. The apparatus of claim 11, wherein the sensor of the wearable device is an accelerometer.

16. The apparatus of claim 11, wherein the sensor of the wearable device is a vibration sensor.

17. The apparatus of claim 11, wherein determining whether the current location of the user is proximate to an object in the list of objects comprises determining whether an object in the list of objects is within reach of the user.

18. The apparatus of claim 11, wherein the location sensor comprises a GPS sensor.

19. The apparatus of claim 11, wherein the wearable device is a smart watch.

20. The apparatus of claim 11, wherein the wearable device is a smart ring.

\* \* \* \* \*